United States Patent [19]

Hofmann

[11] Patent Number: 5,352,735
[45] Date of Patent: Oct. 4, 1994

[54] POLYMER BLENDS

[75] Inventor: George H. Hofmann, Wilmington, Del.

[73] Assignee: E. I. du Pont de Nemours and Company, Wilmington, Del.

[21] Appl. No.: 108,276

[22] Filed: Aug. 19, 1993

Related U.S. Application Data

[63] Continuation of Ser. No. 734,769, Jul. 23, 1991, abandoned.

[51] Int. Cl.$^5$ .............................................. C08L 77/00
[52] U.S. Cl. ........................................ 525/63; 525/66; 525/179
[58] Field of Search ................... 525/66, 178, 179, 63

[56] References Cited

U.S. PATENT DOCUMENTS

| | | | |
|---|---|---|---|
| 3,780,140 | 12/1973 | Hammer | 260/884 |
| 4,174,358 | 11/1979 | Epstein | 525/183 |

FOREIGN PATENT DOCUMENTS

| | | | |
|---|---|---|---|
| 0336680 | 10/1989 | European Pat. Off. | 525/178 |
| 0369604 | 5/1990 | European Pat. Off. | |
| 1034060 | 2/1986 | Japan | 525/179 |

*Primary Examiner*—Ana L. Carrillo

[57] ABSTRACT

Halide polymer such as polyvinylchloride and polyamide are melt blendable when the melt blending is carried out at a temperature of no greater than about 220° C. and the polyamide has a processing temperature no greater than the temperature of melt blending and the melt blend also incorporates a carboxyl and/or CO-functional ethylene polymer which compatibilizes the PVC and polyamide one with the other.

1 Claim, No Drawings

POLYMER BLENDS

This is a continuation, of application Ser. No. 07/734,769 filed Jul. 23, 1991, now abandoned.

FIELD OF THE INVENTION

This invention relates to blends of vinyl or vinylidene halide polymer and polyamide together with a compatibilizing polymer.

BACKGROUND OF THE INVENTION

U.S. Pat. No. 3,780,140 (Hammer) discloses the preparation of ethylene/carbon monoxide copolymers and their use for blending with compatible amounts of various solid organic blend polymers, such as polyamides, cellulose polymers, vinyl halide polymers, vinylidene halide polymers, alpha-olefin based polymers, and many more.

U.S. Pat. No. 4,174,358 (Epstein) discloses a toughened multiphase composition of polyamide matrix resin and a relatively low tensile modulus polymer, possibly being a carboxyl or carbon monoxidefunctionalized ethylene polymer. The theory of toughening is described as the belief that the low modulus polymer adheres to the polyamide matrix at the interface between the two phases. The polyamide forming the matrix is disclosed to preferably having a melting point in excess of 200° C.

SUMMARY OF THE INVENTION

The present invention involves the discovery that vinyl or vinylidene halide polymer and polyamide can be melt blended under certain conditions that the relatively low melting halide polymer does not degrade, and useful blended products are obtained. The process of the present invention comprises melt blending the halide polymer and polyamide together at a temperature of less than about 220° C., with the polyamide being melt processable at the temperature of the melt blending, in the presence of an effective amount of ethylene polymer having carbon monoxide and/or carboxyl functionality to compatibilize the halide polymer with the polyamide. The present invention also resides in the composition comprising these polymer components.

DETAILED DESCRIPTION OF THE INVENTION

Vinyl or vinylidene halide polymer is increasingly becoming available from recycling post consumer plastic waste, particularly waste containers, by separation from the high density polyethylene (HDPE) and polyethylene terephthalate (PET) containers present in the plastic waste. The presence of halide polymer in the recycled PET in particular has a devastating effect on the value of the recycled PET, because subsequent melt fabrication of the recycled PET at the high processing temperatures required, e.g., 250° C. causes the halide polymer which is normally melt processed at temperatures less than about 220° C. to thermally degrade within the PET.

It has become desirable to find utility for recycled halide polymer. It has also become desirable to unite barrier properties of halide polymer with that of polyamide to produce novel results.

The vinyl halide or vinylidene halide polymer preferably contains chlorine as the halogen moiety. Polyvinylchloride (PVC) is the most widely available chloride polymer as past consumer waste and hence is preferred in the present invention. The PVC can be a homopolymer of vinyl chloride or a copolymer thereof with a small amount, e.g., up to 20 weight percent, of another copolymerizable monomer such as vinyl acetate or ethylene which does not change the essential character of the homopolymer. The PVC will generally have a glass transition temperature (Tg) of about 80° C. and will normally be melt processed by itself at a temperature of 180–200° C. Polyvinylidene chloride has a higher melt processing temperature, but is somewhat less thermally stable than PVC. In accordance with the present invention, in which other polymer components are present, the halide polymer can withstand higher melt processing temperatures for limited periods of time which are nevertheless sufficient time to accomplish the melt blending, without appreciable or detectable degradation of the halide polymer.

The polyamide component is one which is melt processible at a temperature of less than about 220° C. Some polyamides are melt processable at temperatures less than about 200° C. The melt processing temperature of the polyamide is the temperature at which the viscosity of the polyamide is low enough that it can be deformed and compacted into a unitary, essentially void-free mass. This is not a specific melt viscosity but is a melt viscosity range at which these results can be obtained, which enables the melt processing of the composition of the invention to be carried out. In the case of crystalline polyamide, this viscosity is reached by the melt processing temperature exceeding the melting point (melting point determined by Differential Scanning Calorimetry (DSC) of the polyamide). In the case of amorphous polyamide, which may also contain a crystalline polyamide phase, this viscosity is reached at temperature above the Tg of the polyamide at which the polyamide softens sufficiently to provide the viscosity desired for melt blending. The relatively low melt processing temperature of the polyamides used in the present invention opens the door for the possibility of the halide polymer and polyamide being melt blended without degradation of the halide polymer. The most popular polyamide, polyhexamethylene diamine (Nylon 66) melting at 255° C., cannot be used because of its high melting point. Examples of polyamides having sufficiently low melt processing temperatures include polydodecamethylene dodecanoamide (Nylon 1212) which has a melting point of 184° C., polycaprolactam (Nylon 6) which has a melting point of about 215° C. and the amorphous polyamides prepared by copolymerizing (condensation polymerizing) a mixture of diacids, such as adipic and isothalic acids with hexamethylene diamine.

Despite the higher melting point of some of these polyamides as compared to halide polymer, it has been found that it is possible to melt blend them together at the higher melt processing temperatures that may be required by the polyamide without the halide polymer degrading.

The third component of the melt blend, i.e., the functionalized ethylene polymer promotes this melt blending by its presence in the melt blend, which improves the ability of the halide polymer and polyamide to be thoroughly dispersed within one another without any appreciable degradation of the halide polymer. The ethylene polymer may also aid the thorough mixing of the other polymer components by reducing the melt viscosity of the melt blend.

Preferably, the ethylene polymer is miscible with the halide polymer in the melt blending process, whereby under magnification, the melt blend (upon cooling) has only two phases that are visible, the halide polymer phase and the polyamide phase. When about equal amounts of the halide polymer and polyamide are present, the melt blend result is an intimate blend of co-continuous phases of these polymers, otherwise the melt blend result is a fine dispersion of one of the polymers in a matrix of the other polymer which is present in the greater amount. The miscibility of the ethylene polymer with the halide polymer tends to promote the halide polymer as the matrix phase or co-continuous phase, even when the amount of polyamide somewhat exceeds the amount of halide polymer, depending on the amount of ethylene polymer that is present.

Thus, the proportions of halide polymer and polyamide can vary widely, e.g. 5 to 95 weight percent of each of these polymers can be present to total 100 weight percent of the combination thereof. More often, the proportions of these polymers will each be 40 to 60 weight percent.

The amount of the ethylene polymer incorporated into the melt blend will be an effective amount to compatibilize the halide polymer and the polyamide, one with the other. Typically this amount will be within the range of about 1 to 80 weight percent based on the combined weight of the halide polymer, polyamide, and ethylene polymer. Preferably, the amount of ethylene polymer will be about 5 to 50 weight percent. Often the ethylene polymer will be present in a minor proportion, e.g., about 10 to 40 weight percent based on the combined weight of the polymer components.

The compatibilizing effect of the ethylene polymer is manifested by intimate, essentially void-free contact between the halide polymer and polyamide phases of the melt blend and thus of articles fabricated therefrom, and by a toughness which is greater than either of the halide or polyamide components.

The ethylene polymer achieves its compatibilizing effect in part by being compatible with, preferably miscible with, the halide polymer, and with the carboxyl or carbon monoxide functionality of the ethylene polymer providing interaction with the polyamide. The carboxyl (coo-) and carbon monoxide functionalities are believed to covalently and hydrogen bond, respectively, with the polyamide. Preferably, the ethylene polymer contains both carboxyl and carbon monoxide groups.

Examples of carboxyl-functionalized ethylene polymer are copolymers of ethylene with $C_3$–$C_{12}$ ethylenically unsaturated monocarboxylic acids, $C_1$–$C_{18}$ alkyl esters of ethylenically unsaturated $C_3$–$C_{12}$ monocarboxylic acids, and vinyl esters of $C_3$–$C_{18}$ saturated carboxylic acids. More specific examples include ethylene/vinyl acetate copolymer ethylene/alkyl (meth)acrylic acid copolymer, wherein the alkyl group contains 1 to 8 carbon atoms. Such ethylene polymers include copolymer of ethylene with methyl acrylate, propyl acrylate, n-butyl acrylate, hexyl acrylate, or n-butyl acrylate and/or the corresponding free acids. For these polymers, the proportion of ethylene will generally be about 30 to 60 weight percent, with the carboxyl functionality being about 40 to 70 weight percent, to total 100 weight percent of the copolymer.

Preferably the ethylene polymer is also functionalized with carbon monoxide which enables a small amount of acetate, acrylate, or acrylic acid comonomer to be used, to obtain the hydrogen bonding with the polyamide necessary for compatibilization. Preferred such polymers are ethylene/alkyl (meth) acrylate/carbon monoxide copolymer wherein the alkyl group can have the identities described above. Also preferred are ethylene/vinyl acetate/carbon copolymers. Generally for these copolymers the proportion of ethylene will be about 50 to 70 weight percent, the proportion of acid, acrylate, or acetate will be about 24 to 40 weight percent, and the proportion of carbon monoxide will be about 5 to 15 weight percent, to total 100 weight percent of the ethylene polymer.

The ethylene carboxyl and/or carbon monoxide-functional copolymer preferably is also anhydride modified, i.e., it contains carboxylic acid anhydride groups pendant from the polymer backbone. Anhydride modification typically is obtained by grafting reaction between the preformed copolymer with maleic acid or maleic anhydride to form succinic anhydride groups on the copolymer by conventional procedures. Typically, the amount of anhydride modification will be about 0.1 to 5 weight percent based on the weight of the copolymer. The most preferred ethylene polymer is ethylene/alkyl acrylate/CO copolymer modified with succinic anhydride, wherein the alkyl group has 1 to 4 carbon atoms, and is preferably n-butyl acrylate.

The anhydride modification of the functionalized ethylene polymer provides better bonding to the polyamide phase, believed to result from chemical reaction between the anhydride groups with the polyamide.

The melt blending of the three components can be carried out using conventional equipment such as extrusion screws in an extruder or injection molding machine. Preferably these components are pre-blended such as by dry mixing together of the halide polymer, polyamide, and ethylene polymer. When the halide polymer, such as PVC is from recycle, it will be in the form of chips, having the thickness of containers from which the polymer was derived and measuring about 6 to 9 mm resulting from comminution of the containers. The polyamide and ethylene polymers will typically be in the form of molding granules. Conventional additives such as an antioxidant can also be present in the melt blend.

The melt blends of compositions of the present invention can be melt fabricated into a wide variety of articles by conventional processes such as extrusion and injection molding into such forms as films and molded articles such as containers.

In the following Examples of the invention, parts and percents are by weight unless otherwise indicated.

EXAMPLES

EXAMPLE 1

In the series of experiments covered by this Example the PVC used was OXY 225 having an inherent viscosity of 1.0 (ASTM 1243) and a Tg of about 80° C. This PVC is believed to contain 9.3 weight percent of $TiO_2$ pigments, 3.9 weight percent of $CaCO_3$ filler, 3.9 weight percent of ethylene/vinyl acetate impact modifier and 5.8 weight percent (total) of butyltin stabilizer, acrylic process aid, and lubricant. The polyamide used was nylon 1212 available as Zytel CFE 3535 and having a melting point of 184° C. The ethylene polymer was 60 weight percent ethylene, 30 weight percent n-butyl acrylate, and 10 weight percent carbon monoxide grafted with 0.9 weight percent succinic anhydride groups.

Compositions were prepared by adding the ethylene copolymer, polyamide (dried) and the antioxidant to a Haake 90 mixer. The antioxidant was Irganox 1098, a hindered phenol antioxidant, and was added in the amount of 1 weight percent based on the combined weight of the polymer components of the composition. The mixer set temperature was 180° C. and the rpm was set at 50. After all of the ingredients were added (less than one minute), the mixer temperature was set at 205° C. and the rpm raised to 200. Mixing was continued until the mixture became uniformly molten which occurred at about 200° C. in about 8 minutes. The set temperature was then decreased to 185° C. and the rpm lowered to 75. The mixture temperature decreased to about 205° C. (in about 3 minutes). The PVC was then added and the composition was mixed for about 5 minutes or until homogeneity became evident. During this time the temperature was kept below 205° C. by adjustment of the rpm. The sample was then discharged and quenched in dry ice. Test specimens were compression molded from the compositions prepared in the Haake mixer for testing notched Izod impact strength, elongation, and tensile strength.

In one experiment, the melt blend consisted solely of the PVC and Nylon 1212 (and antioxidant) in 50:50 amounts, and the melt blending caused PVC degradation as evidenced by a dark brown discoloration of the melt blend even before the mixture became homogeneous. This experiment showed that the use of this low melting polyamide by itself, i.e., without the ethylene polymer compatibilizer, did not produce a good result.

Repetition of this experiment except that increasing amounts of ethylene/carbon monoxide copolymer were added gave the results shown in the following table:

TABLE I

|  | A | B | C |
|---|---|---|---|
| PVC | 47.5% | 45.0% | 40.0% |
| Nylon 1212 | 47.5% | 45.0% | 40.0% |
| Copolymer | 5.0% | 10.0% | 20.0% |
| Notched Izod (J/m) | 96 | 144 | no break |
| Tensile Strength (MPa) | 36.4 | 32.1 | 37.6 |
| Elongation (%) | 72 | 70 | 158 |

The test specimens did not reveal any evidence of PVC degradation. The results shown in Table I indicate that as the amount of the ethylene polymer was increased, so did impact strength. Microscopic examination of composition of C after well blending revealed that the PVC was the continuous phase and the polyamide was the only other phase visible, and this phase was present as a fine dispersion in the PVC matrix. The ethylene polymer was miscible with the PVC and not visible as a separate phase.

Test specimens molded from the PVC and Nylon 1212 by themselves have the following properties:

|  | PVC | Nylon 1212 |
|---|---|---|
| Notched Izod (J/m) | 91 | 53 |
| Tensile Strength (MPa) | 29.6 | 51.6 |
| Elongation (%) | 53 | 270 |

The blends of the present invention gave improved impact strength over the principal polymers by themselves.

EXAMPLE 2

Example 1 was essentially repeated except that the ethylene polymer was 60 weight percent ethylene, 30 weight percent n-butyl acrylate, and 10 weight percent carbon monoxide. The melt blend contained 40 weight percent of the PVC composition, 40 weight percent of the 1212 nylon and 20 weight percent of the ethylene polymer (plus 1 weight percent Irganox 1098). The test specimens revealed no evidence of PVC degradation and exhibited the following properties: notched Izod–no break, tensile strength=4981 psi, and elongation=164%. Microscopic examination of the test specimens of this experiment revealed that the PVC and polyamide formed co-continous phases.

EXAMPLE 3

Example 1 was essentially repeated for the series of experiments of this Example except that the polyamide was amorphous polyamide was a tetrapolymer of hexamethylene diamine (HMD)/terephthalic acid (T), HMD/isophthalic acid (I), T/bis(p-aminocyclo-hexyl) methane (PACM), PACM/I wherein the ratio of HMD to PACM was 94/6 weight percent and the ratio of I to T was 70/30 weight percent. This polyamide had a Tg of 127° C. and 1 weight percent of Irganox 1098 antioxidant was present in each blend composition. Test specimens molded from melt blends having the composition disclosed in Table 2 did not reveal any evidence of degradation, and the test results are also shown in Table 2.

TABLE 2

|  | D | E | F | G |
|---|---|---|---|---|
| PVC | 40.0% | 45.0% | 47.5% |  |
| Amorphous Nylon | 40.0% | 45.0% | 47.5% | 100% |
| Copolymer | 20.0% | 10.0% | 5.0% |  |
| Notched Izod (J/m) | No Break | 197 | 139 | 80 |
| Tensile Strength (MPa) | 28.8 | 44.2 | 42.5 | 96.3 |
| Elongation (%) | 41 | 59.0 | 39.0 | 215 |

Microscopic examination of composition D revealed that PVC was the continuous phase and the polyamide was the finely dispersed phase.

EXAMPLE 4

Example 1 was essentially repeated to prepare the compositions H, I, J, and K described in Table 3.

TABLE 3

|  | H | I | J | K |
|---|---|---|---|---|
| PVC Composition | 24.8% | 29.7% | 34.7% | 39.6% |
| Nylon 6 | 24.8% | 29.7% | 34.7% | 39.6% |
| Ethylene copolymer | 49.5% | 39.6% | 29.7% | 19.8% |
| Irganox 1098 | 1% | 1% | 1% | 1% |

The melt blending was carried out without any appreciable degradation as evidenced by the absence of any dark brown discoloration as encountered in the PVC/nylon 212 melt blending experiment of Example 1 wherein no ethylene polymer was present.

As many widely different embodiments of this invention may be made without departing from the scope and spirit thereof, it is to be understood that this invention is not limited to the specific embodiments thereof except as defined in the appended claims.

I claim:

1. A composition comprising:

a) 40–60 weight parts polyvinyl chloride or polyvinylidene chloride;
b) 40–60 weight parts polyamide;
c) 1–20 weight parts copolymer comprising:
   i. 50–70 weight parts ethylene units;
   ii. 24–40 weight parts $C_1$–$C_4$ alkyl acrylate $C_1$–$C_4$ alkyl methacrylate, vinyl acetate, arcylic acid or methacrylic acid units;
   iii. 5–15 weight parts carbon monoxide unites; and
   iv. 0.1–5 weight parts anhydride graft units, whereby the weight parts of a),b) and c) total 100 and the weight parts of i.,ii,iii, and iv also total 100.

* * * * *